United States Patent
Odendall et al.

(10) Patent No.: US 7,517,501 B2
(45) Date of Patent: Apr. 14, 2009

(54) EXHAUST SYSTEM FOR INTERNAL COMBUSTION ENGINES

(75) Inventors: Bodo Odendall, Neuburg (DE); Hans-Ulrich Bahl, Wettstetten (DE)

(73) Assignee: Audi AG, Ingolstadt (DE)

( * ) Notice: Subject to any disclaimer, the term of this patent is extended or adjusted under 35 U.S.C. 154(b) by 660 days.

(21) Appl. No.: 10/182,568

(22) PCT Filed: Apr. 6, 2001

(86) PCT No.: PCT/EP01/03987

§ 371 (c)(1),
(2), (4) Date: Jul. 31, 2002

(87) PCT Pub. No.: WO01/79666

PCT Pub. Date: Oct. 25, 2001

(65) Prior Publication Data
US 2003/0010023 A1    Jan. 16, 2003

(51) Int. Cl.
  F28F 3/00    (2006.01)
  F28F 3/12    (2006.01)
  F01N 3/02    (2006.01)
(52) U.S. Cl. .................. 422/173; 165/51; 165/168; 165/169; 165/170
(58) Field of Classification Search ............... 422/173, 422/198, 177; 60/297, 299, 311
See application file for complete search history.

(56) References Cited

U.S. PATENT DOCUMENTS

| | | | |
|---|---|---|---|
| 838,703 A * | 12/1906 | Fouche .................... 165/170 |
| 2,021,995 A * | 11/1935 | Delos .......................... 62/523 |
| 2,966,955 A | 1/1961 | Smith ......................... 181/265 |
| 3,605,389 A | 9/1971 | Buttler ........................ 60/311 |
| 3,852,041 A * | 12/1974 | Moore et al. ................ 422/176 |
| 3,910,042 A * | 10/1975 | Yuge et al. .................. 422/173 |
| 4,083,185 A * | 4/1978 | Aizawa et al. ............... 60/299 |
| 4,083,694 A * | 4/1978 | Takeda et al. ............... 422/198 |
| 4,215,742 A * | 8/1980 | Weed .......................... 165/51 |
| 4,338,998 A * | 7/1982 | Goloff ........................ 165/165 |
| 5,086,837 A * | 2/1992 | Hagemeister .............. 165/170 |
| 5,118,477 A * | 6/1992 | Takikawa et al. ........... 422/179 |
| 5,322,672 A * | 6/1994 | Breuer et al. .............. 422/180 |
| 5,517,757 A * | 5/1996 | Hayashi et al. ........ 29/890.039 |
| 5,701,736 A | 12/1997 | Morishima et al. .......... 60/297 |

FOREIGN PATENT DOCUMENTS

| | | | |
|---|---|---|---|
| DE | 197 25 378 | * | 12/1998 |
| DE | 197 42 762 | | 12/1998 |
| EP | 283937 A1 | * | 9/1988 |
| EP | 0 839 995 A1 | | 10/1997 |

* cited by examiner

Primary Examiner—Jennifer A Leung
(74) Attorney, Agent, or Firm—Novak Druce & Quigg LLP

(57) ABSTRACT

The invention relates to an exhaust system for internal combustion engines, especially for use in motor vehicles, comprising an exhaust gas purifying device and a temperature control device disposed in the exhaust path between the internal combustion engine and the exhaust gas purifying device, said temperature control device being provided with a heat exchanger. In order to simplify the construction of such an exhaust system and to achieve a defined cooling capacity, the heat exchanger is configured as a radiation cooler with internal radiation sheets radiating the energy towards the housing.

8 Claims, 5 Drawing Sheets

Figure 2:
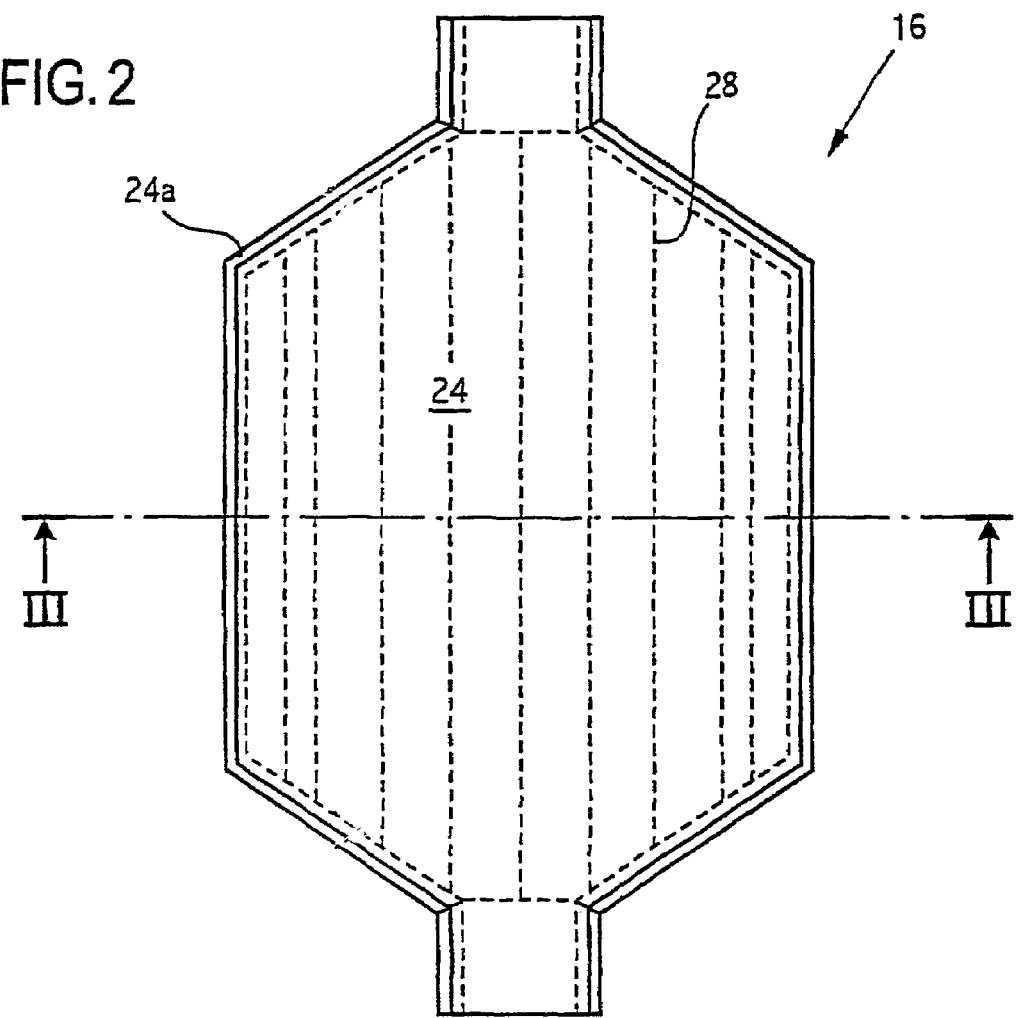

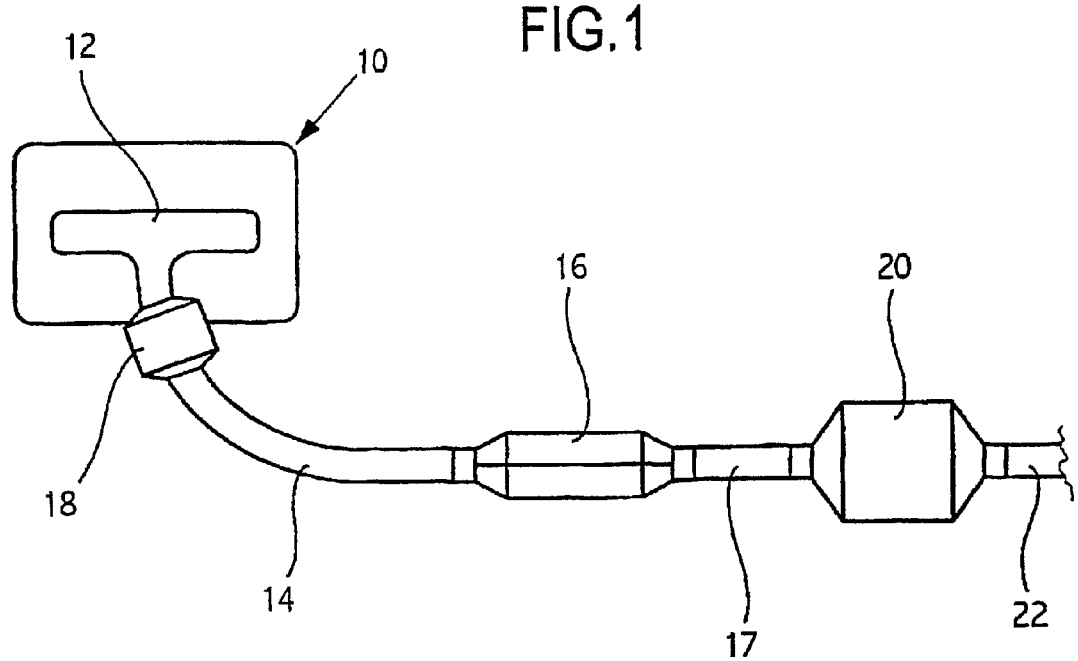
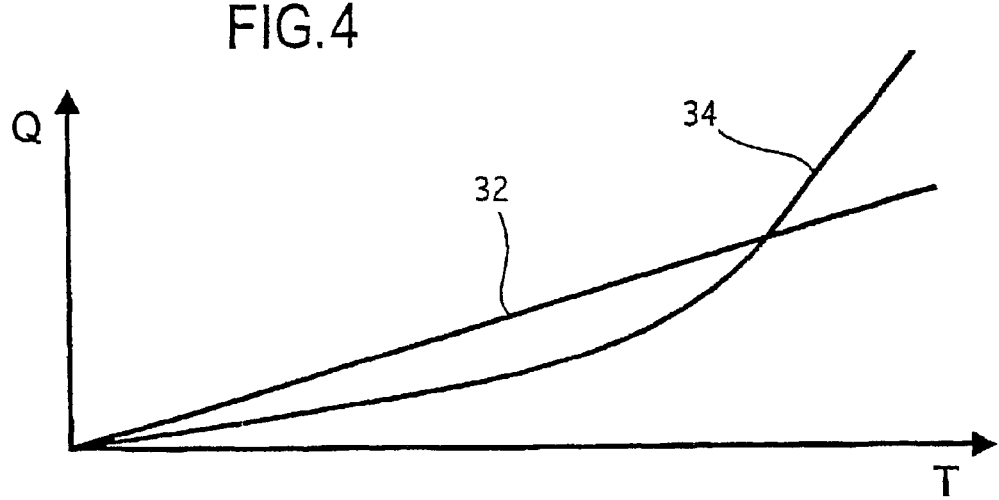

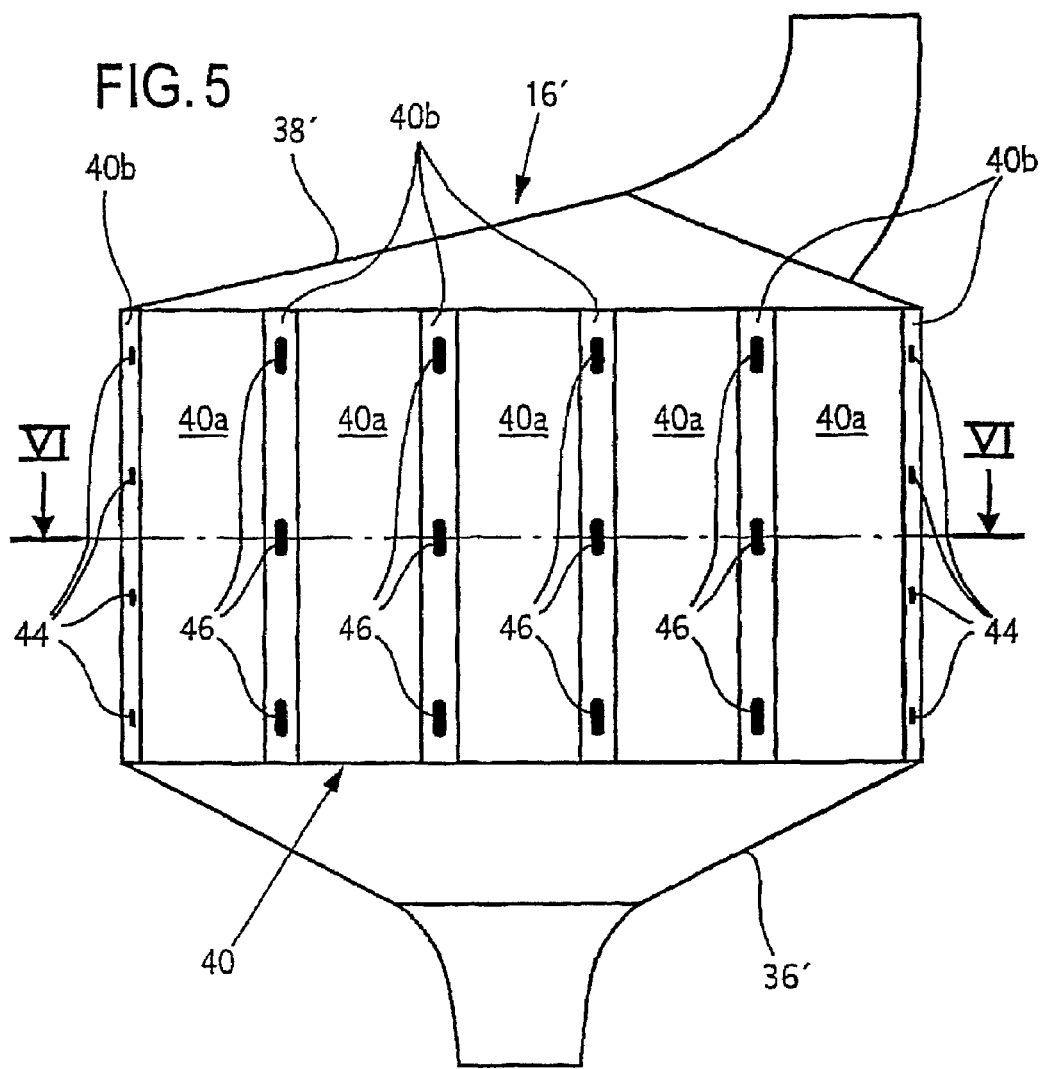
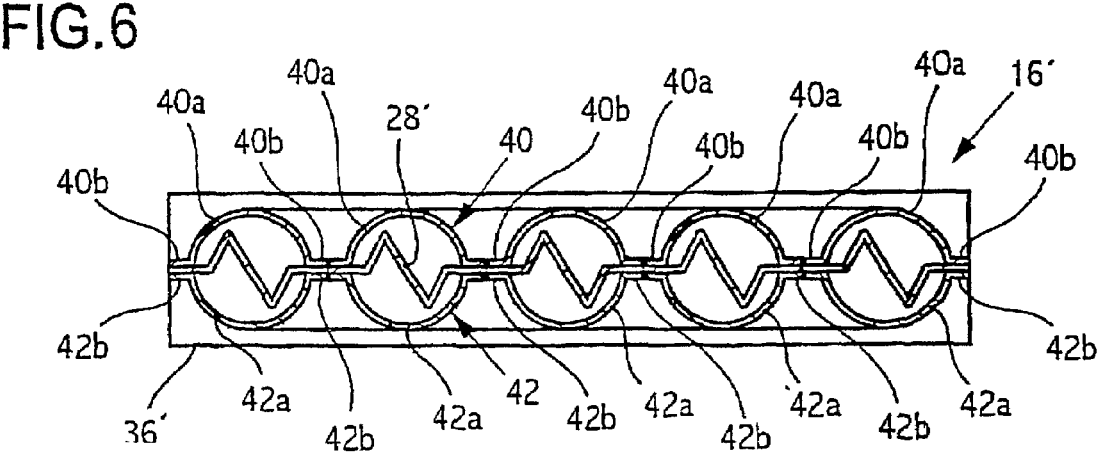

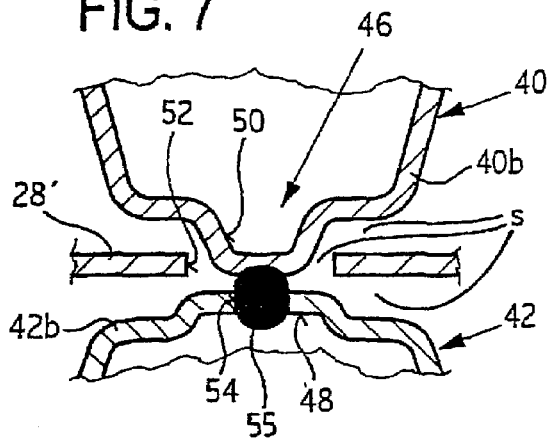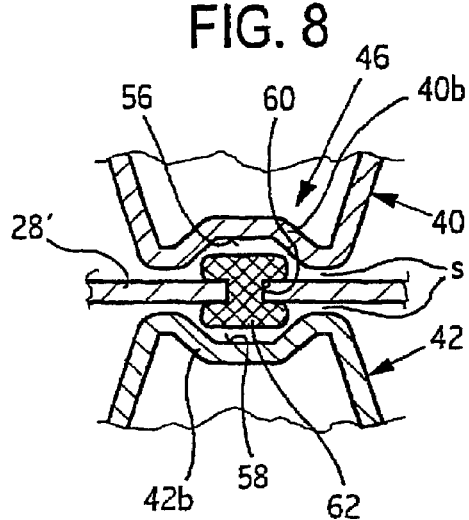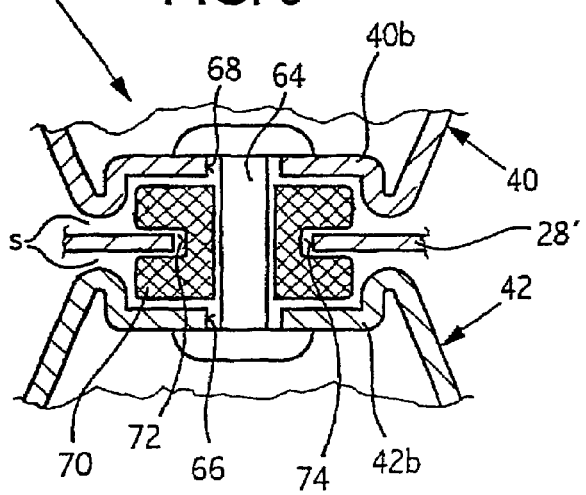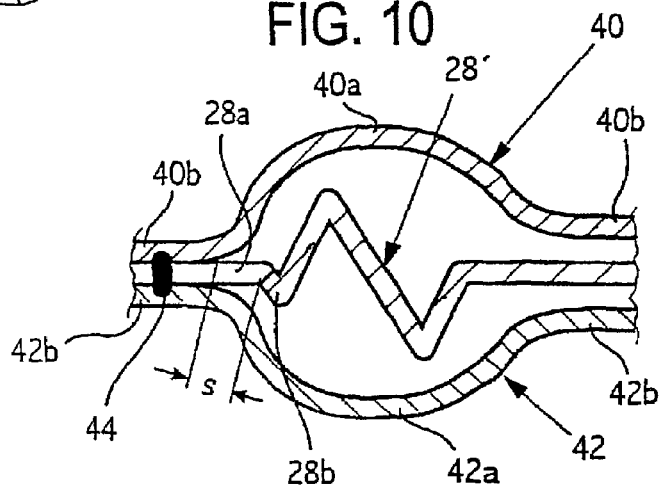

EXHAUST SYSTEM FOR INTERNAL COMBUSTION ENGINES

The invention relates to an exhaust system for internal combustion engines, ones in motor vehicles in particular.

An exhaust system of this kind is disclosed, for example, in DE 197 42 762 C1. The temperature control device for exhaust gases consists of a first waste gas line section in which a controllable valve is installed and a heat exchanger mounted around this waste gas line section with a housing with external cooling ribs and interior heat conducting plates extending from the line section to the housing. The controllable valve is opened for rapid heating of a catalytic converter situated downstream and the exhaust gas flows directly through the interior line section. If the downstream catalytic converter has reached a specific temperature, the valve is closed and the exhaust gas is now conducted through the external heat exchanger for cooling.

SUMMARY OF THE INVENTION

The object of the invention is to develop a generic exhaust system which is substantially simpler in structure.

The invention thus proposes that the heat exchanger as radiative cooler be made up of an external housing with admission and discharge hoppers and with interior radiation sheets radiating toward the housing. In contrast with the heat exchanger previously described, which is designed in accordance with the heat conduction principle and the convection principle, the heat exchanger proposed operates predominantly on the radiation principle.

The advantage of a design such as this lies in the circumstance that, because of the low thermal capacity of the heat exchanger, which preferably is made up of thin sheets, the catalytic converter or adsorber situated downstream is rapidly heated to its light-off temperature, e.g., 250° C., the heat exchanger exerting a relatively slight cooling effect. With elevation of the temperature of the exhaust gases and the heat exchanger, the radiating sheets are intensely heated and increasingly transfer radiative energy to the housing and from the latter to the environment. In accordance with the formula for calculation of the amount of heat given off, the temperature to the fourth power is included in the calculation. The result of this process is a cooling effect increasing sharply at high temperatures, one which makes it possible rapidly to bring the downstream exhaust cleaning device, such as a $DeNO_x$ catalytic converter or three-way catalytic converter, to the light-off temperature and optionally hold it in a desired temperature range without overheating.

By a process favorable from the viewpoint of production technology and design the housing of the heat exchanger may be made with at least two structural sheet elements or half-sheet elements, by deep drawing, for example. At least one of the radiative sheets may be held by simple product design means between connecting flanges molded on the half-sheets of the housing.

For considerations of strength and to reduce any random acoustic radiation effects, the housing may be in the form of side-by-side pipes which may also be made by simple production technology means as half-sheets and connected to each other. The pipes may either directly make up the external housing or a flat housing enclosing the pipes and essentially not coming in heat-conducting contact with the pipes may be provided. The latter design presents in motor vehicles the advantage of low air resistance in the event of laminar flow.

By preference the temperature control device for the exhaust gas treatment device, that is, the downstream catalytic converter, may be exclusively in the form of the heat exchanger and accordingly the self-regulating effect of the latter. That is to say, the controllable valve described in the foregoing and a corresponding bypass line may be dispensed with.

BRIEF DECRIPTION OF THE DRAWINGS

Figure 3:
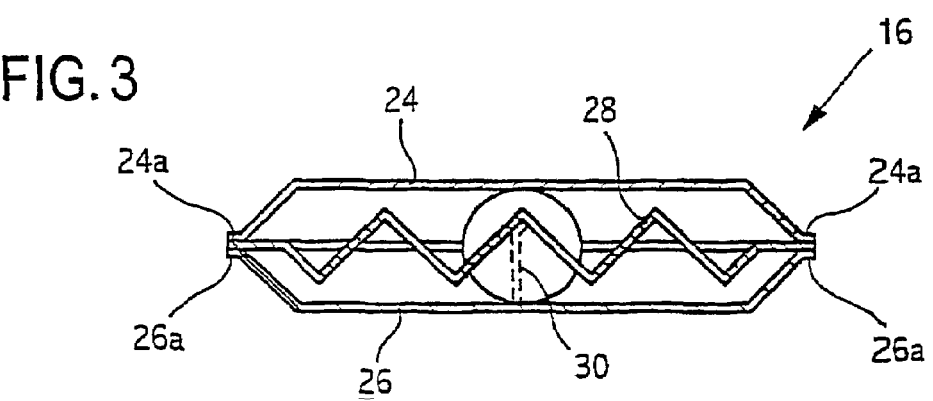
Figure 11:
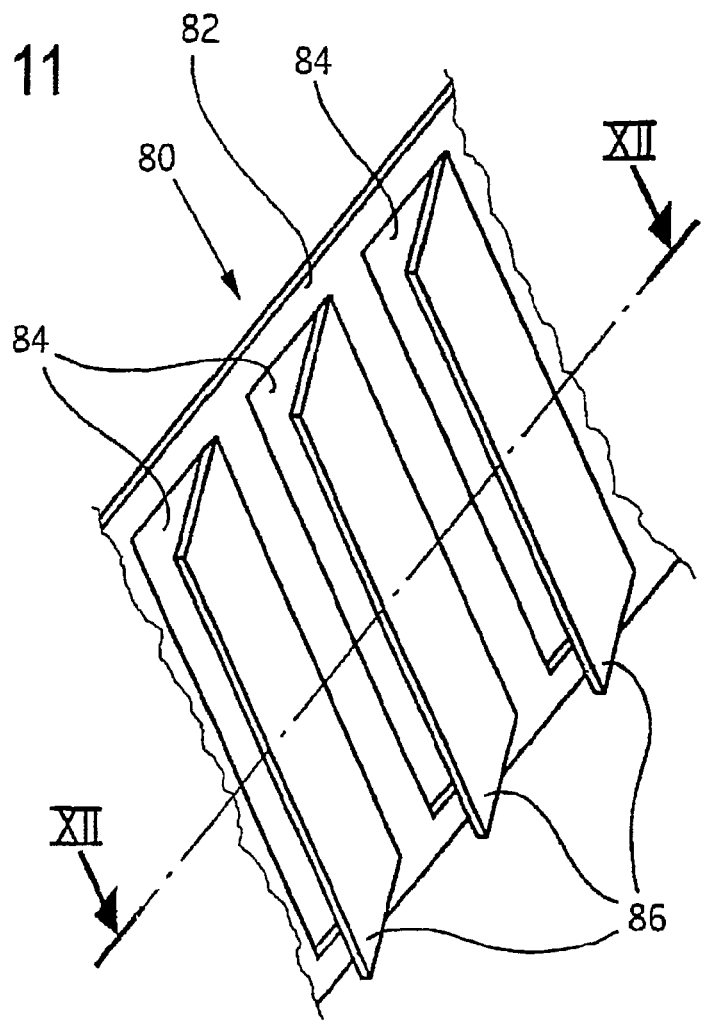
Figure 12:
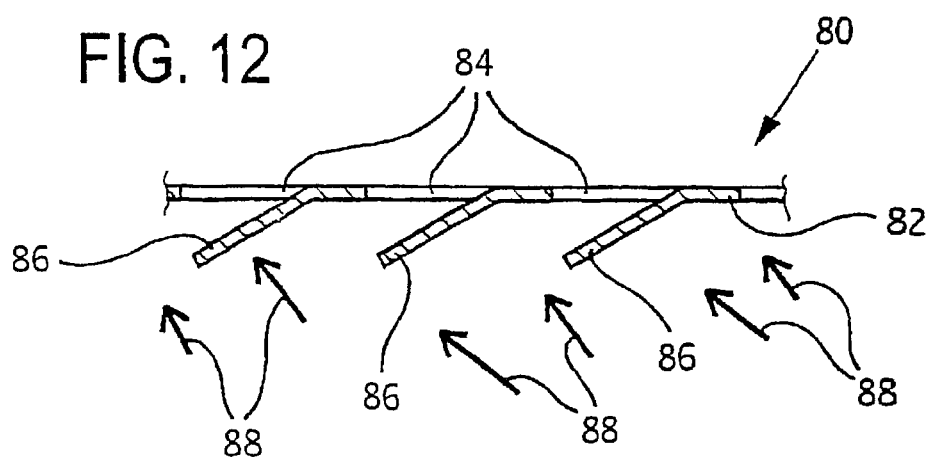

Several embodiments of the invention are described in greater detail in what follows. In the schematic drawing, FIG. 1 shows in part an exhaust system for an internal combustion engine in a motor vehicle, with a heat exchanger as temperature control device and a downstream exhaust gas cleaning device with a $DeNO_x$ catalytic converter;

FIG. 2 a top view of the heat exchanger shown in FIG. 1;

FIG. 3 a cross-section along line III-III in FIG. 2 through the heat exchanger;

FIG. 4 a diagram of the heat exchanger shown in FIGS. 1 to 3 illustrating the thermal flux plotted against the exhaust gas temperature divided into convective components and radiative components;

FIG. 5 a top view of a modified heat exchanger whose outer housing is in the form of a plurality of pipes arranged side by side;

FIG. 6 a cross-section along line VI-VI in FIG. 5;

FIGS. 7 to 10 embodiments of the areas of connection between the half-shells on the housing side and the radiative plate, each on an enlarged scale;

FIG. 11 a shielding plate to be fastened to the bottom of the heat exchanger; and FIG. 12 a section along line XII-XII through the shielding plate shown in FIG. 11.

BREIF DESCRIPTION OF THE INVENTION

FIG. 1 presents a diagram of an internal combustion engine 10 for a motor vehicle with an exhaust gas manifold 12, an exhaust gas input pipe 14, with a three-way precatalyst 18 inserted between them, a heat exchanger 16 as temperature control device, and an exhaust gas cleaning device connected downstream by a line 17 to a $DeNO_x$ adsorber 20. The rest of the exhaust system, for example, a primary baffle and an exhaust gas output pipe, is connected to the adsorber 20 by way of a line 22.

The heat exchanger 16 (see FIGS. 2 and 3) has a housing 24,26 to guide exhaust gas, a housing made up of deep-drawn half shells 24,26 of sheet steel. The half shells 24,26 are provided with circumferential connecting flanges 24a,26a between which a radiative plate 28 subdividing the housing 24,26 in the direction of exhaust gas flow is held, for example, by electric resistance welding (rolled seam welding).

Formed on each half of the half shells 24,26 is an admission or discharge hopper by way of which the heat exchanger 16 is connected to the connecting exhaust gas lines 14,17.

The housing 24,26 of the heat exchanger 16 is more or less rectangular as viewed in cross-section and has a smooth surface (FIG. 3). In addition, the radiative plate 28, also made of sheet steel, is in zigzag form extending transversely to the direction of exhaust gas flow in order to increase the radiative surface of the radiative plate 28. Optionally a guide plate 30 positioned more or less centrally could be provided on the radiative plate 28 in order to prevent oscillations. Aside from the welded connections and optionally the guide plate 30, as is obvious from the drawing the radiative plate 28 is isolated from the housing 24,26 by an air gap.

Because of the relatively thin steel plates, the heat exchanger 16 described possesses low thermal capacity, that is, the heated exhaust gas initially undergoes little cooling and thus permits rapid heating of the exhaust gas cleaning device or adsorber 20.

In this connection the diagram in FIG. 4 presents the heat transfer Q of the heat exchanger 16 plotted against the exhaust gas temperature T. As is to be seen, in contrast with the more or less linearly increasing convection cooling (line 32), the radiation cooling (curve 34) is initially small. This favors rapid heating of the exhaust gas cleaning device 20.

With increase in the exhaust gas temperature T and period of operation of the internal combustion engine the radiative plate 28 and the housing 24,26 of the heat exchanger 16 are further heated, the radiation heating increasing extraproportionally. This is to be seen from the common equation $$Q = \Phi A T^4$$

Without entering into the equation in detail one may infer that the temperature to the fourth power enters into it. With increase in the radiation component the radiative plate 28 is thermally coupled to the half-shells 24,26, as a result of which in the aggregate the surface of the heat exchanger 16 available for convective heat radiation is increased.

This increase in exhaust gas cooling brings about an effect of self-regulation of the exhaust gas temperature with little heat radiation during a cold start of the internal combustion engine and higher cooling efficiency at high exhaust gas temperatures, so that optionally a bypass line and a throttle valve controlling it may be dispensed with and exclusively the heat exchanger 16 serves as temperature control device.

The modified heat exchanger 16' illustrated in FIGS. 5 and 6 has a multisectional housing also of sheet steel; it is made up of the admission hopper 36', the discharge hopper 38', and two half-shells 40,42 between them.

The half-shells 40,42 are in the form of a plurality of semicircular pipe sections 40a or 42a which are mounted parallel to each other and are joined by connecting flanges 40b or 42b per half shell 40,42 to form a single structural unit.

The half shells 40,42 or their externally positioned connecting flanges 40b,42b are joined together, for example, by rolled seam welds, so as to be gas tight; similarly, the admission hopper 36' and discharge hopper 38' are welded gas tight to the frontal surfaces of the half shells 40,42, so that a gas tight housing is created with, in exemplary embodiment 5, gas-conducting pipes or pipe sections 40a,42a in the area between the admission hopper 36' and the discharge hopper 38'.

Between the half-shells 40,42 there is mounted a radiative plate 28' which, as viewed in cross-section (see FIG. 6), is flat in the area of the connecting flanges 40b,42b and in zigzag form in the area of the pipes 40a,42a in order to ensure effective radiation of thermal energy to the pipes 40a,42a.

The radiative plate 28' is welded in the outer areas of connection to the connecting flanges 40b,42b by way of suitably shaped joint bars 28a only at local connection points 44 (see FIG. 5 and FIG. 10). In the other edge areas this plate is set back in order to form an air gap s and is provided with an edging 28b which increases the inherent rigidity of the plate in the direction of gas flow.

In addition, the radiative plate 28' is connected at several connection points 46 to the connecting flanges 40b,42b situated further inward of the half shells 40,42 to provide thermal insulation.

As is shown in FIG. 7, the local connection points 46 are formed in such a way that circular or slot-like projections 48,50 are pressed into the connecting flanges 40b, 42b and extend through recesses 52 in the radiative plate 28' to be rigidly connected to each other, for example, by welding or soldering. For this purpose one projection 48 is provided with an opening 54 through which the welding or soldering may be carried out. The recesses 52 in the radiative plate 28' are large enough so that air gaps s remain between the recesses 52 and the projections 48,50. The same applies to the area between the connecting flanges 40b,42b and the radiative plate 28'.

FIG. 8 illustrates the connection points 46 in which recesses 56,58 are formed in the connecting flanges 40b,42b; mushroom-shaped buffers 62 of wire netting or metal wool are introduced into these recesses. The buffers 62 are inserted into recesses 60 in the radiative plate 28'. In other areas, in turn, the radiative plate 28' is isolated from the connecting flanges 40b,42b by way of air gaps s. The radiative plate 28' is thus kept vibration and heat isolated by way of the connecting points 46.

Lastly, FIG. 9 illustrates formation of the connecting points 46 with rivets 64, which extend through corresponding holes 66,68 in the connecting flanges 40b,42b. Spacers 70 made of wire mesh which are retained in corresponding recesses 74 in the radiative plate 28' by way of an annular groove 72 are also fastened between the connecting flanges 40b and 42b. The recesses or grooves 72 are large enough so that relative movement between the spacers 70 and the radiative plate 28' is made possible, for example, to compensate for thermal stresses. Air gaps s are formed, in turn, between the connecting flanges 40b and 42c and the radiative plate 28'.

The connection points 44, 46 presented in FIGS. 7 to 10 and described may be used alternatively or in combination. Optionally the heat exchanger 16' illustrated in FIGS. 5 and 6 may also be designed with a smooth, outer jacket even in the area of the pipelines 42,44, as another housing element.

In addition, a shield plate 80 protecting against water impact may be mounted on the lower side of the heat exchanger 16 or 16' (see FIGS. 11 and 12). It consists of a base plate 82 with openings 84 from which fins 86 are formed, as by stamping, for example. The fins 86 are oriented obliquely backward in the direction of travel of the motor vehicle so that they divert sprayed water in particular (see arrows 88) but do not impede radiation of the thermal energy of the heat exchanger 16.

The shield plate 80 may be connected to the heat exchanger in the areas of its edge and/or by way of the connection points 44,46 described.

The heat exchanger 16 described is also simple from the viewpoint of structure and production technology, rugged in operation, and not sensitive to fouling in the exhaust system. It goes without saying that plates are to be used which yield good emission values especially for the radiative plate 28, but also ones for the surrounding housing.

The radiative plate 28, or optionally a plurality of radiative plates, could also be coated like a three-way catalytic converter or, preferably, like the $DeNO_x$ adsorber 20 to be catalytically effective. In this way the $NO_x$ storage effect of the adsorber 20 can be further increased; in addition, for example, desulfurization of the adsorbers 20 at relatively high converting the chemical exotherms to some extent as early as in the heat exchanger 16 as part of the measures introduced (secondary air feed).

The invention claimed is:

1. A heat exchanger for an exhaust system of a vehicle provided with an internal combustion engine, including upstream and downstream exhaust line sections, comprising:
   an outer housing member;
   a first inner metallic housing member disposed within said outer housing member;
   a second inner metallic housing member disposed within said outer housing member;

said first and second inner metallic housing members each comprising a half-shell in the form of a plurality of semicircular pipe sections, said pipe sections being mounted in parallel and joined together by connecting flanges;

said second inner metallic housing member being disposed in an inverted relation to said first inner metallic housing member, with respective connecting flanges being disposed in alignment, to thereby define a plurality of aligned flange sections and a plurality of aligned pipe sections that define a plurality of passageways intercommunicating with said exhaust line sections;

a single metallic plate member interposed between said first and second inner metallic housing members, said single metallic plate defining a plurality of first sections each disposed between and secured to a pair of connecting flanges of said aligned flange sections, and a plurality of second sections each disposed in one of said passageways defined by said aligned pipe sections, said second sections each having a wave or zigzag form and;

means for securing at least one pair of connecting flanges of said aligned flange sections together, wherein one of said connecting flanges includes a portion projecting through an opening in said plate member, and said portion is welded to the other connecting flange of said pair.

2. A heat exchanger for an exhaust system of a vehicle provided with an internal combustion engine, including upstream and downstream exhaust line sections, comprising:

an outer housing member;

a first inner metallic housing member disposed within said outer housing member;

a second inner metallic housing member disposed within said outer housing member;

said first and second inner metallic housing members each comprising a half-shell in the form of a plurality of semicircular pipe sections, said pipe sections being mounted in parallel and joined together by connecting flanges;

said second inner metallic housing member being disposed in an inverted relation to said first inner metallic housing member, with respective connecting flanges being disposed in alignment, to thereby define a plurality of aligned flange sections and a plurality of aligned pipe sections that define a plurality of passageways intercommunicating with said exhaust line sections;

a single metallic plate member interposed between said first and second inner metallic housing members, said single metallic plate defining a plurality of first sections each disposed between and secured to a pair of connecting flanges of said aligned flange sections, and a plurality of second sections each disposed in one of said passageways defined by said aligned pipe sections, said second sections each having a wave or zigzag form; and means for securing at least one pair of connecting flanges of said aligned flange sections together, including a spacer disposed therebetween.

3. A heat exchanger according to claim 2 wherein said spacer is formed of a gas permeable material.

4. A heat exchanger according to claim 3 wherein said spacer comprises a metal wool material.

5. A heat exchanger according to claim 4 wherein said spacer comprises a body of one of wire netting and wire mesh.

6. A heat exchanger according to claim 2 wherein said spacer is wherein at least one of said aligned flange sections is recessed and receives a portion of said spacer.

7. A heat exchanger according to claim 2 wherein said spacer is provided with a recess in a side wall thereof which receives a portion of said plate member.

8. A heat exchanger according to claim 2 including at least one passageway between said spacer and an adjacent connecting flange, intercommunicating adjacent passageways of said inner metallic housing members.

* * * * *